Patented Nov. 5, 1946

2,410,575

UNITED STATES PATENT OFFICE 2,410,575

PROCESS OF PREPARING SUBSTANCES HAVING VITAMIN A ACTIVITY AND NEW VITAMINOUS PRODUCTS

Norris D. Embree and Edgar M. Shantz, Rochester, N. Y., assignors to Distillation Products, Inc., Rochester, N. Y., a corporation of Delaware No Drawing. Application June 16, 1943, Serial No. 491,068. In Great Britain July 6, 1942

9 Claims. (Cl. 260—488)

This invention relates to the synthesis of substances having vitamin A activity and in particular to procedure for the conversion of anhydro vitamin A into substances exhibiting vitamin A activity.

Anhydro vitamin A is known to occur in fish liver oils. Also, it can be prepared by treatment of vitamin A ester with alcohol or by treatment of vitamin A with acidified alcohol or antimony trichloride. Anhydro vitamin A was heretofore incorrectly called "cyclized vitamin A." It is a hydrocarbon and exhibits an absorption curve with maxima at about 350, 370 and 390 m$\mu$. Anhydro vitamin A has little or no vitamin A activity and procedure whereby it can be converted into a substance or substances having vitamin A activity would, therefore, be of considerable importance. Reference is made to an Embree article, "Journal of Biological Chemistry," 128 (1939) 197, and an article by the present inventors "Journal of Biological Chemistry," 132 (1940) 619, for a detailed discussion of the nature of anhydro vitamin A which, at the time of these publications was designated as "cyclized" vitamin A.

This invention has for its object to provide procedure for the conversion of anhydro vitamin A into a substance having vitamin A activity. A still further object is to provide procedure for the conversion of anhydro vitamin A into vitamin A-active ethers and/or esters. Another object is to provide new products having vitamin A activity. Another object is to improve the state of the art. Other objects will appear hereinafter.

These and other objects are accomplished by our invention which includes treating anhydro vitamin A with an acidic substance for a period of time sufficient to convert it into a vitamin A-active material.

In the following description we have given several of the preferred embodiments of our invention, but it is to be understood that these are set forth for the purpose of illustration, and not in limitation thereof.

The conversion of the anhydro vitamin A by treatment with an organic acid can be brought about by merely maintaining these two substances in contact with each other, preferably in the presence of a mutual solvent. The reaction is slow at low temperature and at room temperature requires several days. The reaction time can be considerably reduced by the use of elevated temperatures. However, elevated temperatures cause thermal decomposition of vitamin A-active material and where time is not of particular importance it is best to utilize relatively low temperatures such as from —20° C. to about 100° C. Oxygen causes destruction of vitamin A-active materials and contact with air during the treatment should be avoided as much as possible. The presence of an inert atmosphere is advantageous. Examples of suitable acids are acetic, propionic, butyric, oleic and benzoic. Stoichiometric amounts or amounts in excess thereof are preferred. However, smaller amounts can be used with somewhat slower and incomplete conversion.

The conversion of anhydro vitamin A into a vitamin A-active substance by treatment with an acidic substance in the presence of an alcohol such as methyl, ethyl or benzylalcohol apparently results in the formation of an ether whereas an organic acid alone appears to give an ester product. If the ether is desired an alcohol preferably a low molecular weight aliphatic alcohol is used. The reaction can be brought about with hydrochloric acid, the organic acids above mentioned, or other acidic substances. A suitable solvent for the reactants can be used and is advantageous with the higher alcohols. The lower molecular weight alcohols are preferred since they act as solvents as well as reactants. Stoichiometric amounts of alcohol or in excess of stoichiometric amounts are preferred but smaller amounts of the alcohol may be used. Inorganic acids such as hydrochloric, sulfuric, etc., acids may be used. Anhydrous conditions may be used but are not preferred. The presence of small amounts of water favors the formation of the vitamin A-active products.

Example I

A solution containing 2 grams of anhydro vitamin A in 900 cc. of 90% aqueous ethyl alcohol was made 1/30 m. with HCl. This solution was allowed to stand for seven days at 5° C. During this time the spectrum had shifted from a triple absorption curve with a maxima at about 350, 370 and 390 m$\mu$ (characteristic of anhydro A) to a single absorption band at 328 m$\mu$. This material was chromatographed on magnesia and a fraction removed which was somewhat more strongly adsorbed than anhydro vitamin A. This fraction weighed 0.231 gram and had E(1%, 1 cm.)(328 m$\mu$)=640 and E(1%, 1 cm.)(620 m$\mu$)=1490 for the blue colored reaction product between it and antimony trichloride.

Example II

A solution of 0.1 gram of anhydro vitamin A was allowed to stand for two days at room temperature in a solution of 90 cc. ethyl alcohol, 5 cc. water, and 5 cc. of glacial acetic acid. Again the u. v. absorption maximum shifted to 320–330 m$\mu$.

Example III

However, when an inactive solvent (ethyl ether) was substituted for the alcohol in Example II, and this solution of anhydro vitamin A was left in contact with acetic acid for six days, a fraction was obtained which indicated by chemical and physical tests the presence of an acetate having a vitamin A activity.

Example IV

A solution of 2 grams of anhydro vitamin A in 800 cc. of glacial acetic acid and 25 cc. of water was allowed to stand for seven days at 5° C. The ultraviolet absorption maximum shifted to between 320 to 330 m$\mu$. Upon chromatographing on a column of magnesia, a fraction was separated which weighed 0.479 gram and had the characteristics of vitamin A acetate. Its absorption maximum was at 328 m$\mu$ with $$E(1\%, 1 \text{ cm.}) = 840$$

It gave a blue color with SbCl$_3$ of $$E(1\%, 1 \text{ cm.}) (620 \text{ m}\mu) = 1500$$

The values of E(1%, 1 cm.) at 328 m$\mu$ were determined by measuring the light absorption of the materials in ethyl alcohol solution with an ultra violet spectrophotometer. The values of E(1%, 1 cm.) at 620 m$\mu$ were determined by measuring the light absorption of the materials in chloroform solution containing about 20% antimony trichloride with an automatic recording spectrophotometer.

What we claim is:

1. The process which comprises treating anhydro vitamin A with an organic acidic substance in a medium containing an appreciable amount of water until the anhydro vitamin A has been at least partially converted into a vitamin A-active material having a higher potency and recovering the vitamin A-active material from the reaction mixture.

2. The process of preparing a vitamin A-active material which comprises treating anhydro vitamin A with an alcohol in the presence of an acidic substance and in a medium containing an appreciable amount of water until the anhydro vitamin A has been at least partially converted into a vitamin A-active material having a higher potency recovering the vitamin A-active material from the reaction mixture.

3. The process of preparing a vitamin A-active material which comprises treating anhydro vitamin A with an alcohol in the presence of an acid and in a medium containing an appreciable amount of water until the anhydro vitamin A has been at least partially converted into a vitamin A-active material of higher potency and separating this more potent vitamin A-active material from the reaction mixture and recovering the vitamin A active material from the reaction mixture.

4. The process of preparing a vitamin A-active material which comprises treating anhydro vitamin A with an alcohol in the presence of hydrochloric acid and in a medium containing an appreciable amount of water until the anhydro vitamin A has been at least partially converted into a vitamin A-active material having a higher potency and recovering the vitamin A active material from the reaction mixture.

5. The process of preparing a vitamin A-active material which comprises treating anhydro vitamin A with an aliphatic alcohol in the presence of hydrochloric acid and in a medium containing an appreciable amount of water until the anhydro vitamin A has been at least partially converted into vitamin A-active material having a higher vitamin A potency and recovering the vitamin A active material from the reaction mixture.

6. The process of preparing a vitamin A-active material which comprises treating anhydro vitamin A with a lower aliphatic alcohol in the presence of an organic acid and in a medium containing an appreciable amount of water until the anhydro vitamin A has been at least partially converted into a vitamin A-active material of higher potency and recovering the vitamin A active material from the reaction mixture.

7. The process of preparing a vitamin A-active material which comprises treating anhydro vitamin A with an organic acid in a medium containing an appreciable amount of water until the anhydro vitamin A has been at least partially converted into a vitamin A-active material of higher potency and recovering the vitamin A active material from the reaction mixture.

8. The process of preparing a vitamin A-active material which comprises treating anhydro vitamin A with a low molecular weight aliphatic acid in a medium containing an appreciable amount of water until the anhydro vitamin A-active substance has been at least partially converted into a vitamin A-active material of higher potency and recovering the vitamin A active material from the reaction mixture.

9. The process of preparing a vitamin A-active material which comprises treating anhydro vitamin A with acetic acid in the presence of ether and in a medium containing an appreciable amount of water until the anhydro vitamin A has been at least partially converted into a vitamin A-active material of higher potency and recovering the vitamin A active material from the reaction mixture.

NORRIS D. EMBREE.
EDGAR M. SHANTZ.